(No Model.)
C. D. COURTRIGHT & C. A. POWELL.
CORN HARVESTER.
No. 473,298. Patented Apr. 19, 1892.
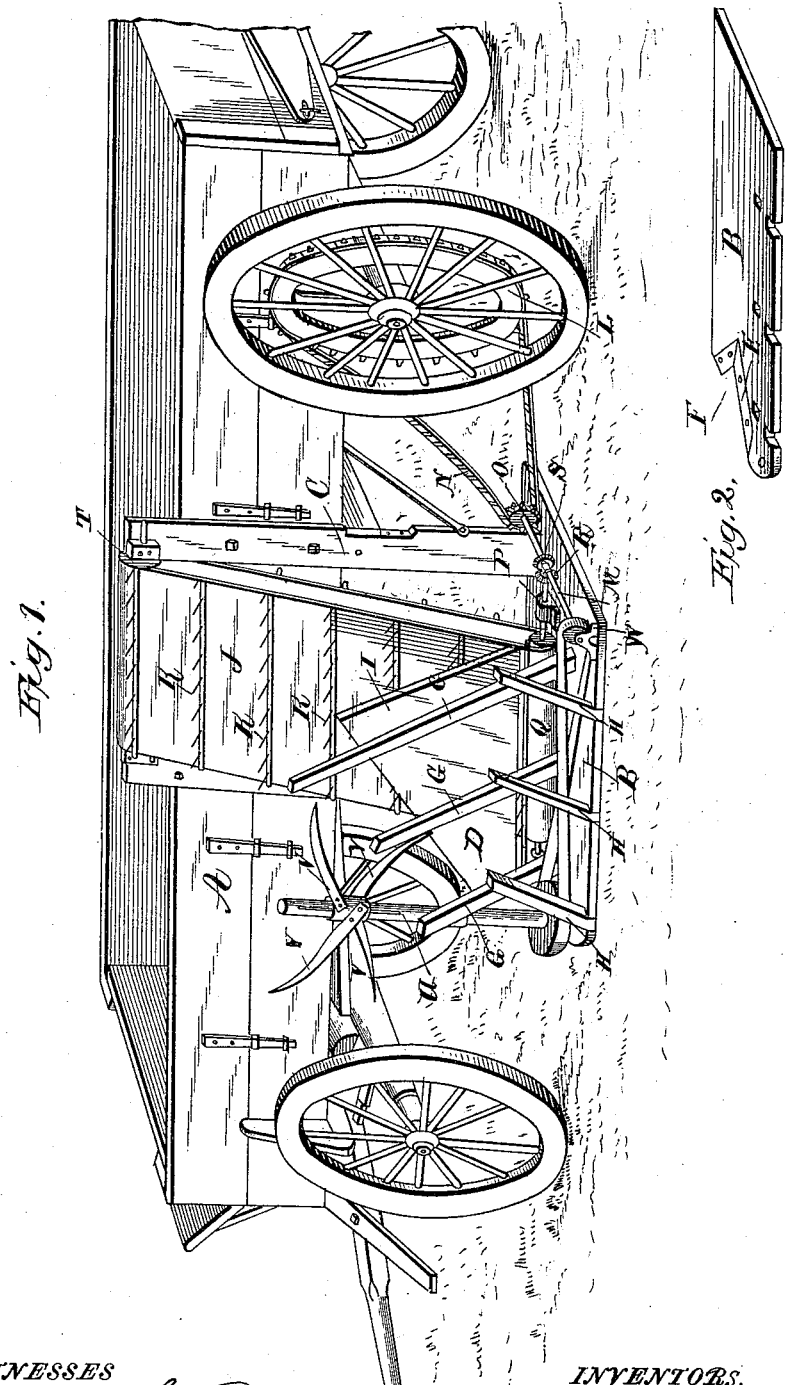
WITNESSES
N. K. Mendenhall
J. M. Yznaga.
INVENTORS.
C. D. Courtright
C. A. Powell
by Howard Bros & Co.
Attorneys.

UNITED STATES PATENT OFFICE.

CHARLES D. COURTRIGHT AND CLARENCE A. POWELL, OF KENESAW, NEBRASKA.

CORN-HARVESTER.

SPECIFICATION forming part of Letters Patent No. 473,298, dated April 19, 1892.

Application filed April 29, 1891. Serial No. 391,019. (No model.)

*To all whom it may concern:*

Be it known that we, CHARLES D. COURTRIGHT and CLARENCE A. POWELL, residents of Kenesaw, in the county of Adams and State of Nebraska, have invented certain new and useful Improvements in Corn-Harvesters; and we do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to new and useful improvements in corn-cutters, the object of the invention being to construct a machine by using a wagon of any suitable construction as the main body and running-gear of the said machine and attaching thereto a depending platform provided with a cutting-edge, and thus in an easy and inexpensive manner provide a complete and efficient machine which will be especially adapted for use on small farms, where the crop of corn would not justify the use of a more expensive machine.

Further, the invention has for its object, in addition to simply cutting the corn, the collecting of the corn as it is cut, using for this purpose the carrying capacity of the wagon, and for the conveyance of the same when the wagon becomes full to a suitable place where it may be stacked and otherwise cared for.

The invention therefore consists in providing a wagon of any suitable construction—such as will withstand the strain to which it will be subjected—with a depending platform, which is preferably attached to the side thereof, the said platform being provided with a V-shaped cut in its front end and having knives or a cutting-edge provided in such opening whereby to cut the stalks as they are received therein and suitable devices for depositing the corn in the wagon as it is cut, all as hereinafter set forth.

In the accompanying drawings, forming a part of this specification, Figure 1 represents a perspective view of a wagon having the corn-cutting platform attached thereto and suitable devices mounted on said platform for automatically loading the wagon. Fig. 2 is a perspective view of the cutting-platform, showing the cutting edge or knife portion.

Referring to the drawings by letter, A indicates the wagon to which the platform B is attached, and may be of any suitable construction, the main consideration being stoutness of build and weight.

The platform B is provided with uprights C C, which are firmly secured to the heavy timbers forming the side of the wagon, and these uprights C C form the main depending supports of the platform B.

There are preferably two platforms, one on each side of the wagon and located midway between the wheels, as this provision admits of cutting back when the end of a field of corn is reached. The platforms are provided with a crib-like structure D, which will prevent the stalks of corn as they are cut from falling off the platform.

The knives E with which the platform is provided are arranged at an angle to each other and project slightly over the edge of the V-shaped cut F made in the front of the platform for the reception of the cornstalks, and as the stalks enter they are forced against the knives and severed.

The platform, as shown, is provided with a number of small beams G, secured to the platform on an outward slant of about forty-five degrees. Smaller beams H are also secured to the platform at its edge and are fastened firmly to the beams G to reinforce the same. To this frame-work is preferably secured on its inner side a board I, of triangular shape, having its smallest end near the cutting-knives. By this construction a crib is formed in conjunction with the conveying-belt J, which is also arranged on a slant from the top of the wagon-body to the foot of the beams G, in which the cornstalks will fall, and, by virtue of the slant of the crib, will be thrown in contact with the belt J and be taken up and deposited into the wagon by the rows of pins K with which said belt is provided.

The conveying-belt J is operated by means of a sprocket-wheel L, provided on the inner side of the rear wheel on the side of the wagon on which the cutting devices are arranged, and the revolving of the sprocket-wheel L with the wagon-wheel imparts a rotary motion to the shaft M, which shaft M is mounted in suitable bearings on the rear of the platform and transverse thereto, by means of the sprocket-chain N and the wheel O on the inner end of the shaft M. At right angles to the shaft M is arranged a shaft P, on which the roller Q is firmly secured. Motion is imparted to this roller-shaft P by means of a gear-wheel R on the end of said shaft engaging with the gear-wheel S on the shaft M, which gear-wheel S is located about central of the shaft. The upper roller T of the conveying-belt is mounted on a shaft having its bearings in the end of the supports C, which are preferably made to extend above the wagon-body a short distance. In addition to the belt we have provided a device for catching the corn and giving support to the upper part of the stalk when being cut. This device consists of a standard U, pivotally mounted on the outer forward corner of the platform, having arms V on its upper portion. The standard with its projecting arms is rotated by means of a belt running from a pulley-wheel W on the shaft M and around a wheel on the base of the standard.

Having thus described our invention, what we claim, and desire to secure by Letters Patent, is—

In a corn-harvester machine, the combination, with a wagon, of the uprights secured to the side thereof, having a platform attached thereto at their lower ends, said platform being provided with a cutting end, a crib provided on said platform, and an endless-belt conveyer driven by a sprocket-chain running from a sprocket-wheel on the wagon-wheel to a sprocket-wheel on a shaft mounted on the platform and transverse thereto, said shaft having a suitable gear-wheel mounted thereon and operating the roller-shaft at right angles thereto, substantially as described.

In testimony that we do claim the foregoing as our own we hereby affix our signatures in presence of two witnesses.

CHARLES D. COURTRIGHT.
CLARENCE A. POWELL.

Witnesses:
T. A. TEMPLETON,
W. C. HISAM.